Patented Oct. 15, 1929

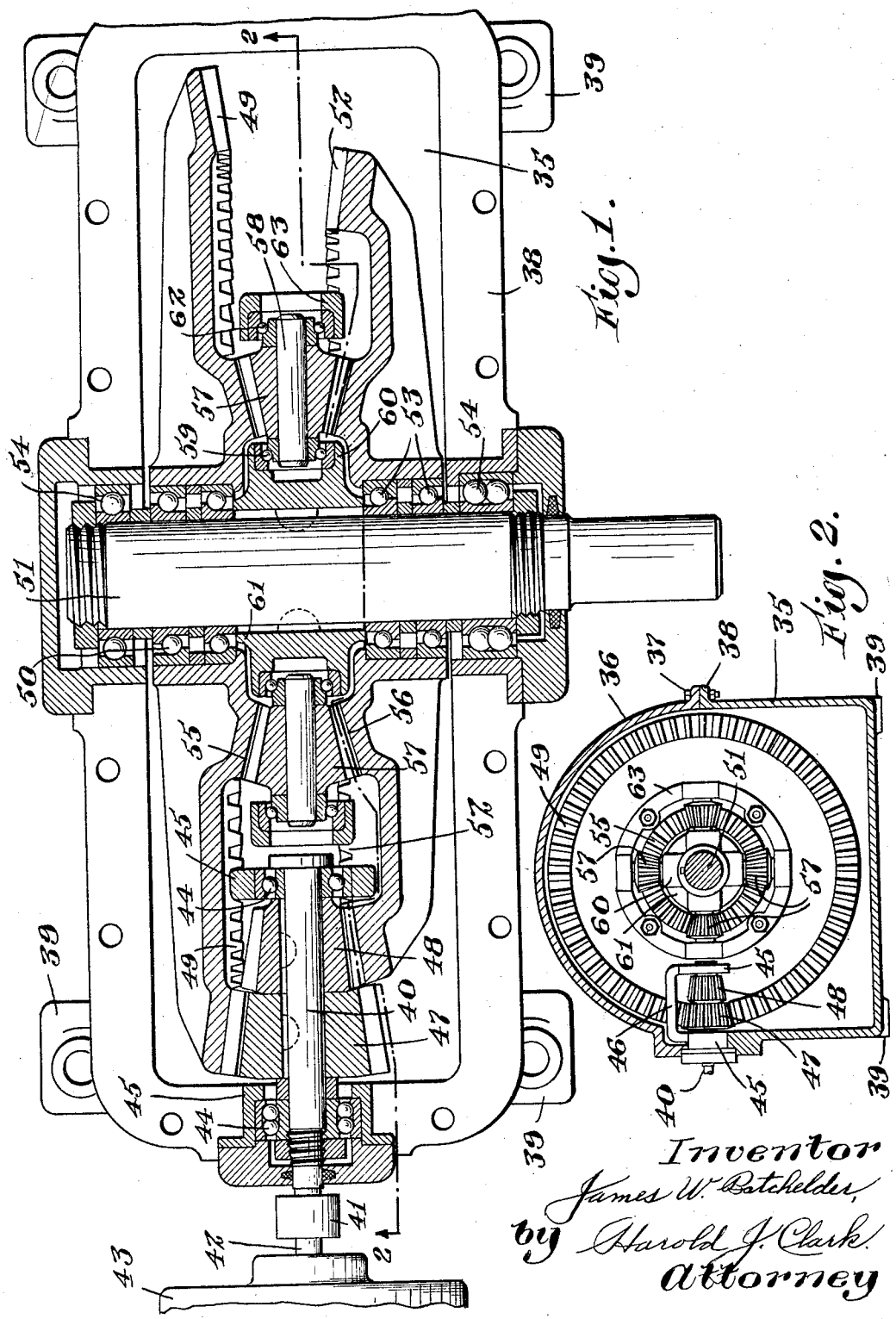

1,731,233

UNITED STATES PATENT OFFICE

JAMES W. BATCHELDER, OF BROOKLINE, MASSACHUSETTS

APPARATUS FOR THE REDUCTION OF SPEED

Application filed August 16, 1928. Serial No. 299,987.

My present invention relates to novel methods and apparatus for use in the reduction of speeds.

An important object of the present invention is the provision of novel means for effecting the reduction of operating speeds of prime movers to a practicable and usable extent.

A further object of the invention resides in the simplicity of the mechanism by which I accomplish the above highly desirable result.

Another object of the present invention resides in the fact that by the utilization of my novel mechanism, I am enabled to use higher speeds of prime movers, which will greatly reduce the size, expense, and space necessary for both the prime mover and the reduction unit. My invention may be applied to prime movers of any type or nature, such as steam driven engines, turbines, gas engines, oil engies, electric motors, or any other type of prime mover. All of the prime movers just mentioned tend to develop increased horsepower as their speed is increased. Such speed, heretofore, has been limited to a great extent, by the speed reduction unit or mechanism which has been interposed between the source of power and the driven machine or element. Such prior reduction units, when constructed with high ratios, such as the worm drive, have been inefficient, or are extremely intricate, complicated, cumbersome and expensive. This is particularly true when utilizing the multiple stage planetary transmission, or the variable speed reduction units.

Another important object of the present invention, therefore, is to eliminate or obviate the above outlined difficulties and disadvantages which have been present in prior speed reduction mechanisms.

Many further advantages result from my invention. For example, when utilizing an electric motor as the prime mover, a great saving in copper windings and other materials will be effected because of the increased operating speed permitted by my novel reduction mechanism. Other types of prime movers may be made much smaller and correspondingly stronger, as well as being, as will be readily understood, much less expensive than prior cumbersome mechanisms.

In conjunction with the reduction of size of such prime movers, vast savings in fuel and power will result, solely because of the interpositioning, between the prime mover and the driven element or machine, of my novel reduction mechanism or unit.

My novel speed reduction mechanism is compact, inexpensive to manufacture, relatively light in weight, effective and efficient to a high degree.

Briefly stated, the essence of my invention consists in rotating in opposite directions, by means of a suitable source of power two members at different speeds, and providing means, such as a pinion or series of pinions interposed between said members and operable thereby, to drive a driven member, such as a shaft, at a speed equal to a portion of the difference of the speed of rotation of said two members. I find that a novel type of epicyclic gear train, operated by said two rotating members, produces the most efficient results. If the speeds of the two oppositely rotating members were equal, the epicyclic motion of the interposed pinions would be zero. Thus rather than reducing the speed in successive steps or stages, I preferably start with zero motion or speed, and work from there toward equal ratios.

As illustrated in the drawings of the present application, the means employed in reducing speeds to a high ratio is by means of a spider or a series of arms mounted on a driven shaft in such a manner and position as to receive an epicyclic motion which will be imparted by the two oppositely rotating members or units. The means of driving or contacting the two units may be by any kind of gearing or friction drive desired.

The means of contact of the interposed epicyclic members with the two units may be of any type of toothed or friction connection desired.

To a great extent, the structures illustrated in the present drawings are for illustrative purposes, as other means of driving the differential units, or the epicyclic members, will readily occur to those skilled in this art.

One example of the high ratios possible with my novel mechanism would be the combination of a twenty-four tooth pinion cooperating with a two hundred and thirty-nine tooth unit, and a twenty-three tooth pinion cooperating with a two hundred and twenty-nine tooth unit, which would give an ultimate speed reduction of 54,734.5 to 1.

The above and other objects of the invention, details of construction, combinations of parts and advantages, will be hereinafter more fully pointed out, described and claimed.

Referring to the drawings, illustrating preferred embodiments of the present invention, Fig. 1 is a plan sectional view of a right angle drive; and Fig. 2 is a vertical sectional view on the line 2—2 of Fig. 1.

Referring now to the drawings, for a particular description of the invention, its construction, assembly and operation, the reduction mechanism is mounted in a casing comprising a lower section 35 and an upper section 36, united by bolts 37 through flanges 38, the section 35 having legs or supports 39 thereon for securing the structure on a suitable support.

In this modification I provide a shaft 40 driven, through the medium of a coupling 41 by a shaft 42 which last mentioned shaft is in turn driven or rotated by a motor 43 or any other desirable source of power. This shaft 40 is mounted in anti-friction bearings 44, at each end thereof, said bearings being carried in the arms 45 of a frame 46. Keyed to the shaft 40 is a pinion 47 and also a pinion 48, these pinions being of different sizes. The pinion 47 meshes with a bevel gear 49 rotatably mounted on anti-friction bearings 50 on the shaft 51. The pinion 48 meshes with a smaller bevel gear 52 rotatably mounted on anti-friction bearings 53 on the shaft 51. The shaft 51 is mounted at each end, in anti-friction bearings 54.

Since the pinions 47 and 48, keyed to the shaft 40, rotate in the same direction, they will impart rotation in opposite directions to their respective bevel gears 49 and 52. The speeds of rotation of the two gears 49 and 52 will be different, because of the different ratios, as will be apparent from a glance at the drawings.

The gears 49 and 52 are respectively provided with beveled faces 55 and 56, and interposed between and meshing with these beveled faces are a series of beveled pinions 57 mounted on short shafts 58. These shafts 58 are mounted at one end in anti-friction bearings 59 carried in bosses 60 on a spider 61 which is keyed to the shaft 51, and at the other end in bearings 62 carried in a split ring 63. As the gears 49 and 52 rotate in opposite directions, therefore, and at different speeds of rotation, rotation will also be imparted to the pinions 57, and an epicyclic motion of the pinions 57 and hence of the spider 61 will be effected, causing rotation of the shaft 51 at a speed of rotation greatly less than the speed of rotation of the shaft 40, said speed being a portion of the difference of rotation of the two gears 49 and 52. By varying the sizes of the pinions 47 and 48, and the sizes of their respective gears 49 and 52, infinite varieties of speed reductions can be effected.

It will thus be apparent that I have devised an extremely simple and efficient speed reduction mechanism, one which is economical to manufacture, and easy to assemble, and yet which is positive and efficient in operation, and capable of producing high ratios between the driving and the driven shafts.

While I have necessarily described my invention somewhat in detail, it will be appreciated that I may vary the size, shape and arrangement of parts within reasonably wide limits without departing from the spirit of the invention. Preferably, however, the number of parts in my novel mechanism will remain constant irrespective of the resultant ratios of speed reduction.

My invention is further described and defined in the form of claims as follows:

1. In a device of the kind described, a driving shaft, a single source of power to rotate said shaft, a pair of pinions of different sizes fixed to said shaft and simultaneously and constantly rotatable therewith, a pair of gears of different sizes rotatable only in opposite directions and at different speeds by said pinions, each of said gears having a beveled gear integral therewith and at one side thereof, a driven shaft positioned at right angles to said driving shaft, a spider keyed to said driven shaft, and a plurality of beveled pinions rotatably mounted on said spider and adapted to receive an epicyclic motion from said beveled gears whereby the said driven shaft will be rotated at a speed intermediate the difference of speed of rotation of said gears and at an invariable ratio.

2. In a device of the kind described, a driving shaft, a single source of power to rotate said shaft, a pair of beveled pinions of different sizes fixed to said shaft and simultaneously and constantly rotatable therewith, a pair of beveled gears of different sizes rotatable only in opposite directions and at different speeds by said pinions, each of said gears having a beveled gear integral therewith and at one side thereof, a driven shaft positioned at right angles to said driving shaft, said pair of gears being mounted for free rotation around said driven shaft, a spider keyed to said driven shaft, and a plurality of beveled pinions rotatably mounted on said spider and adapted to receive an epicyclic motion from said beveled gears whereby the said driven shaft will be rotated at a speed intermediate the difference of speed of rotation of said gears and at an invariable ratio.

3. In a device of the kind described, a casing, a driving shaft, a single source of power to rotate said shaft, a pair of beveled pinions of different sizes fixed to said shaft and simultaneously and constantly rotatable therewith and within said casing, a substantially U-shaped frame affixed to the casing and extending inwardly thereof and providing bearings for the ends of said shaft, a pair of beveled gears of different sizes rotatable only in opposite directions and at different speeds by said pinions, each of said gears having a beveled gear integral therewith and at one side thereof, a driven shaft positioned at right angles to said driving shaft, said pairs of gears being mounted for rotation around said driven shaft, a spider keyed to said driven shaft, and a plurality of beveled pinions rotatably mounted on said spider and adapted to receive an epicyclic motion from said beveled gears whereby the said driven shaft will be rotated at a speed intermediate the difference of speed of rotation of said gears and at a positive invariable ratio.

In testimony whereof, I have signed my name to this specification.

JAMES W. BATCHELDER.